US006290193B1

(12) United States Patent
Williams et al.

(10) Patent No.: US 6,290,193 B1
(45) Date of Patent: *Sep. 18, 2001

(54) MOUNTING APPARATUS FOR FLEXIBLE SIGN PANELS

(75) Inventors: Jeffrey A. Williams; Grant D. Dicke, both of Downers Grove, IL (US)

(73) Assignee: Dicke Tool Company, Downers Grove, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/330,898

(22) Filed: Jun. 11, 1999

Related U.S. Application Data

(63) Continuation-in-part of application No. 08/915,881, filed on Aug. 21, 1997.

(51) Int. Cl.[7] .............................. F16M 11/00; A47F 5/00; A47F 7/00; A47B 96/00; A47K 1/00

(52) U.S. Cl. ......................... 248/200; 248/224.7; 248/314

(58) Field of Search ..................................... 248/514, 534, 248/538, 539, 200, 224.7, 314; 40/606, 610, 612

(56) References Cited

U.S. PATENT DOCUMENTS

| | | | |
|---|---|---|---|
| 1,390,736 | 9/1921 | Wadsworth . | |
| 1,485,846 | 3/1924 | Griffin . | |
| 1,699,735 | 1/1929 | Dabrohua et al. . | |
| 1,873,178 | 8/1932 | Bernstein . | |
| 2,160,426 | 5/1939 | Archer | 116/2 |
| 2,484,096 | 10/1949 | Kay | 244/153 |
| 3,143,817 | 8/1964 | Paulson | 40/125 |
| 3,200,786 | 8/1965 | Swezy et al. | 116/63 |
| 3,526,200 | 9/1970 | Doyle | 116/63 |
| 3,899,843 | 8/1975 | Doyle et al. | 40/125 |
| 4,015,802 | 4/1977 | Heredia | 244/153 |
| 4,426,800 | 1/1984 | Brown | 40/606 |
| 4,481,729 | 11/1984 | Weiller | 40/606 |
| 4,490,934 | 1/1985 | Knapp | 40/603 |
| 4,507,887 | 4/1985 | Seely | 40/606 |
| 4,592,158 | 6/1986 | Seely | 40/603 |
| 4,798,356 | 1/1989 | Alonso | 244/153 |
| 4,888,894 | 12/1989 | Brown, Jr. | 40/603 |
| 5,090,143 | 2/1992 | Schier et al. | 40/152.1 |
| 5,446,984 | 9/1995 | Kulp et al. | 40/610 |
| 5,979,847 * | 11/1999 | Williams et al. | 248/200 |
| 6,003,827 * | 12/1999 | Kulp et al. | 40/606 |
| 6,047,941 * | 4/2000 | Kulp et al. | 40/612 |
| 6,053,658 * | 4/2000 | Gibson, Jr. | 40/612 |
| 6,056,250 * | 5/2000 | Hillstrom et al. | 40/612 |

FOREIGN PATENT DOCUMENTS

| | | |
|---|---|---|
| PCT/US91/00397 | 7/1991 | (WO) . |

* cited by examiner

*Primary Examiner*—Ramon O. Ramirez
*Assistant Examiner*—J. DeLuca
(74) *Attorney, Agent, or Firm*—Fitch, Even, Tabin & Flannery

(57) ABSTRACT

A mounting receptacle is provided for securement to a flexible message panel. The mounting receptacle defines a housing for receiving a support rib. A threshold portion is hingedly coupled to the housing portion allowing a rib to contact the threshold portion while the housing portion is bent out of the way of the rib. The rib is telescopically received in the housing portion and, when released, tensions the message panel in a planar message-displaying condition.

17 Claims, 11 Drawing Sheets

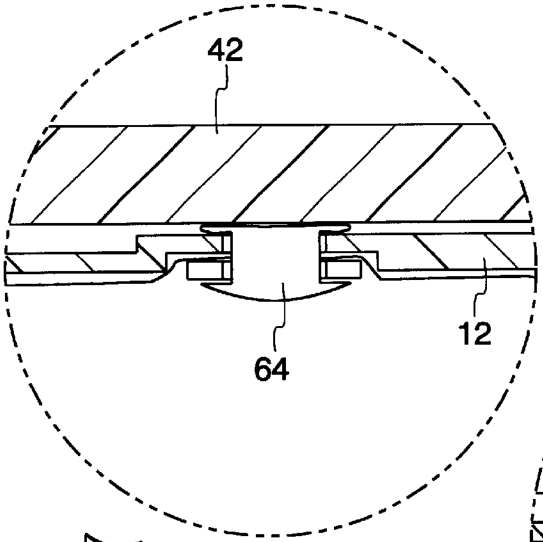
Fig. 4
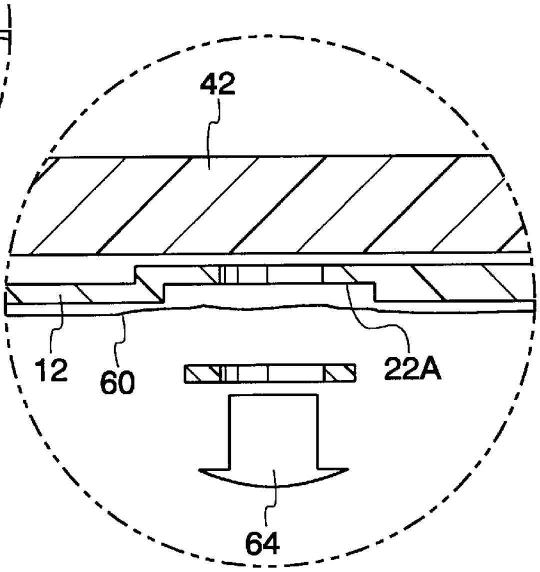
Fig. 5
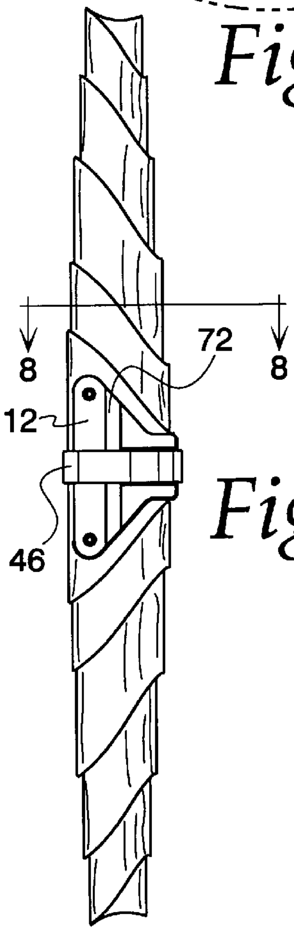
Fig. 7
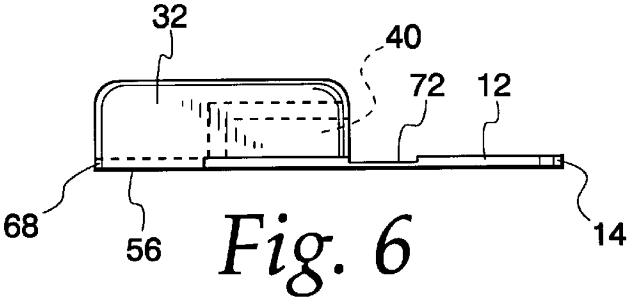
Fig. 6
Fig. 8
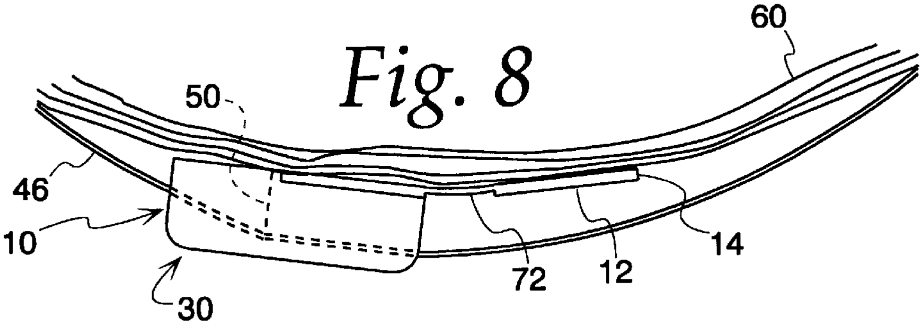

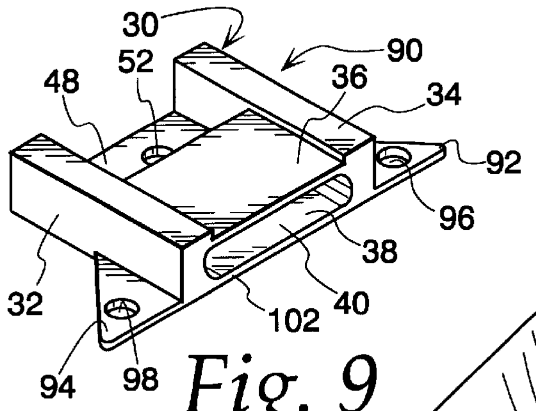
Fig. 9
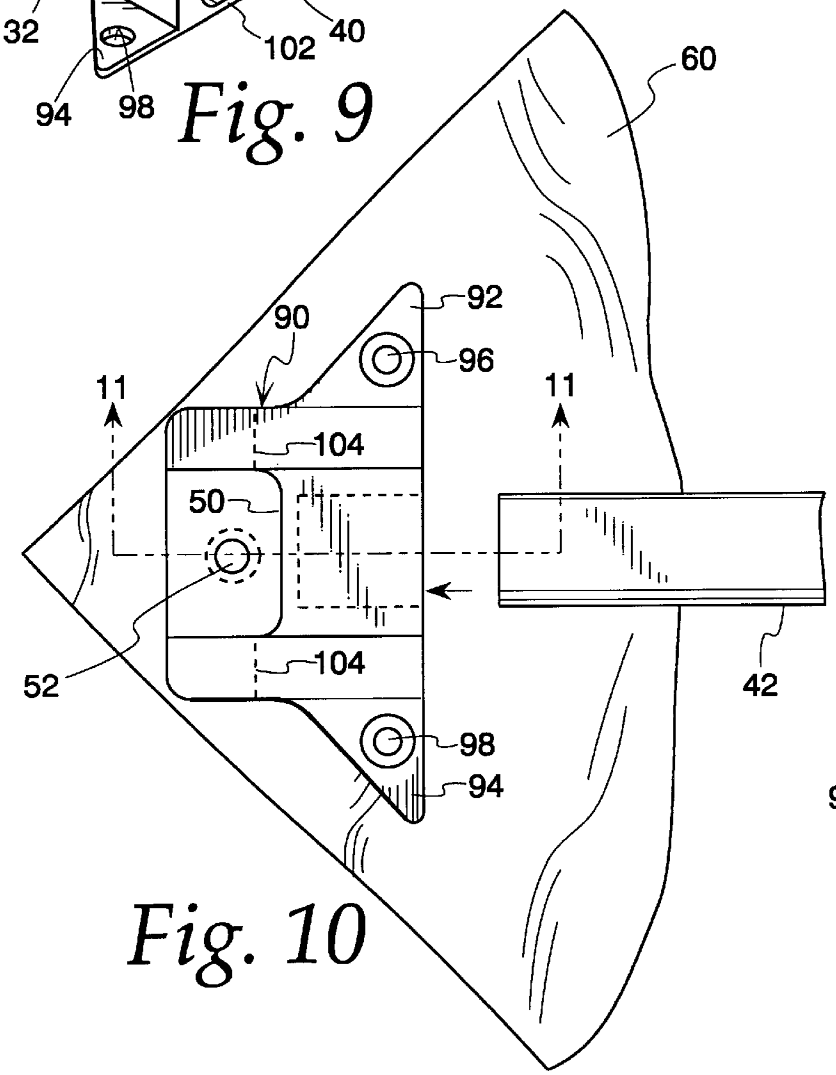
Fig. 10
Fig. 12
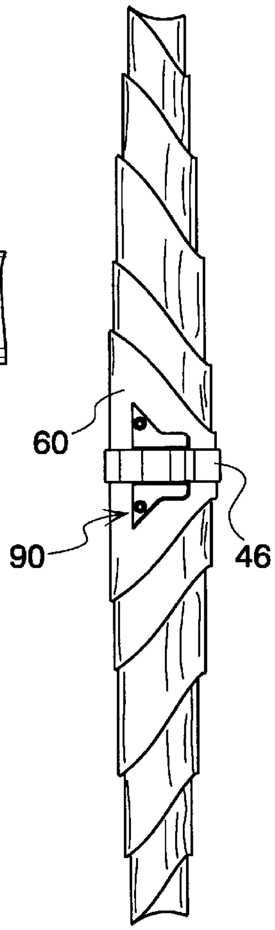
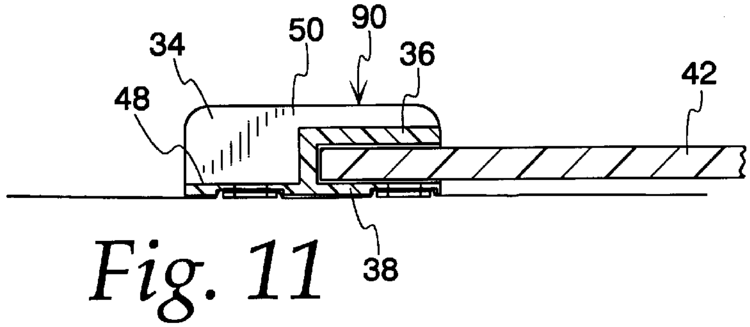
Fig. 11

MOUNTING APPARATUS FOR FLEXIBLE SIGN PANELS

CROSS REFERENCE TO RELATED APPLICATIONS

This is a continuation-in-part application of application Ser. No. 08/915,881, filed Aug. 21, 1997.

BACKGROUND OF THE INVENTION

1. Field of the Invention

The present invention pertains to flexible sign panels and in particular to such sign panels which are rolled up for compact storage.

2. Description of Related Art

Temporary highway signs warning motorists of roadside work activities have been employed for some time. It is common today, for warning sign systems to be considered in the early stages of planning a roadside improvement. With higher rates of speed and increased volume of traffic, a need for more advanced warning of temporary worksite conditions has been recognized. The implemetation of large numbers of signs of increased visibility and which are easy to deploy would aid in this regard.

Improvements to temporary warning signs have been realized by providing flexible message panels, typically make of a flexible fabric, such as plastic mesh material made of polyethylene or vinyl plastics. Over the years, these types of panels were improved with the addition of fluorescent materials to increase their ability to reflect light from oncoming vehicles. Commonly, reinforcing ribs or struts are used to maintain the flexible panels in a flat message-displaying condition. Ribs of glass fiber composition have been a popular choice for suspending flexible message panels. However, light weight metal tubing has also been a popular choice for displaying flexible message panels, and collapsible supporting systems have been proposed in commonly assigned U.S. Pat. No. 4,694,601.

Flexible sign panels must be stretched taut to maintain a flat position. Wind gusts and traffic induced wind bursts put substantial strain on a flexible sign panel, particularly at its points of support. Accordingly, various arrangements for joining supporting ribs to a flexible message panel have been proposed. For example, fabric pockets have been employed in U.S. Pat. Nos. 3,899,843 and 3,526,200, while resilient straps have been proposed in U.S. Pat. No. 4,592,158. As an alternative solution, rigid panel pockets have been proposed in U.S. Pat. Nos. 4,426,800 and 4,490,934. However, improvements are still being sought to provide a more compact storage of flexible message panel systems.

SUMMARY OF THE INVENTION

Accordingly, it is an object of the present invention to provide a means for attaching a support member to a flexible message panel, particularly at the corners of the flexible message panel.

Another object of the present invention is to provide a mounting arrangement of the above-described type which allows a flexible message panel and its supporting members to be collapsed and rolled into a compact package for storage.

A further object of the present invention is to provide mounting apparatus in the form of a rigid pocket which safely transmits forces from the supporting ribs to the message panel fabric while remaining flexible to permit advantages of compact storage.

Yet another object of the present invention is to provide mounting apparatus of the above-described type which is constructed from a minimum number of inexpensive parts.

These and other objects according to the principles of the present invention are provided in a mounting receptacle for attaching a support rib to a flexible panel, comprising:

a housing portion defining an interior cavity and an opening leading to the interior cavity, dimensioned to received the support rib, the housing portion having an upper wall, a floor with a bottom surface for engaging the flexible panel, and a rear wall and a pair of side walls extending between the upper wall and the floor;

the side walls and the floor extending beyond the rear wall to form a mounting location with first means for attachment to the panel;

a threshold portion having an upper surface for guiding the support rib toward the opening, a lower surface and second means for attachment to the panel; and hinge means coupling the threshold portion and the housing portion so as to dispose the threshold portion in front of the opening.

BRIEF DESCRIPTION OF THE DRAWINGS

FIG. 4 is a fragmentary view of FIG. 3 shown on an enlarged scale;

FIG. 5 is an exploded and view similar to that of FIG. 4;

FIG. 6 is a side elevational view of the mounting receptacle;

FIG. 7 is an elevational view of a message panel with mounting receptacle attached, rolled up for compact storage;

FIG. 8 is a fragmentary cross-sectional view taken along the line 8—8 of FIG. 7;

FIG. 9 is a perspective view of an alternative mounting receptacle according to the principles of the present invention;

FIG. 10 is a top plan view thereof, showing the mounting receptacle attached to a corner of a flexible message panel;

FIG. 11 is a cross-sectional view taken along the line 11—11 of FIG. 10;

FIG. 12 shows the mounting receptacle of FIG. 9 attached to a flexible message panel which has been rolled up for compact storage;

DETAILED DESCRIPTION OF THE PREFERRED EMBODIMENTS

Figure 1:
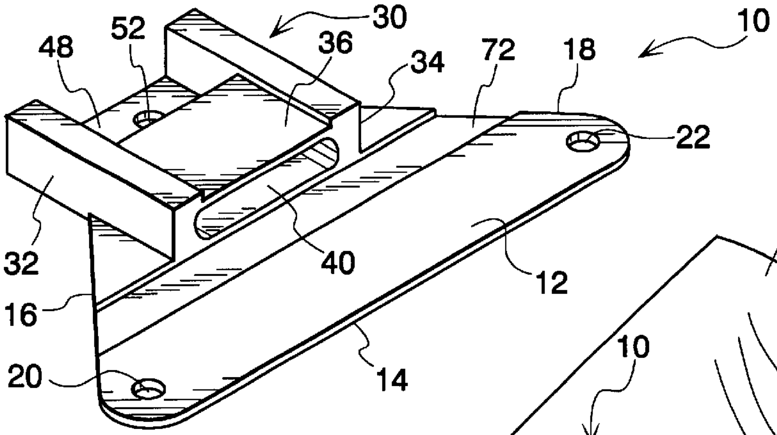
FIG. 1 is a perspective view of a mounting receptacle for use with flexible message panels.

Turning now to FIGS. 1–8, a mounting receptacle is generally indicated at 10. As will be seen herein, mounting receptacle 10 is preferably made as a monolithic one-piece body made of a molded plastic material. The mounting receptacle 10 includes a plate-like hinged threshold 12 of modified triangular configuration. The threshold 12 has a front edge 14 and side edges 16, 18. Mounting holes 20, 22 are located at the corner of front edge 14 and side edges 16, 18.

Mounting receptacle 10 further includes a housing portion generally indicated at 30, including side walls 32, 34 and a recessed top wall 36. The housing portion 30 includes a floor 38 (see FIG. 3) which preferably has a top surface lying in the plane of the top surface of threshold 12. Housing portion 30 defines an internal cavity 40 dimensioned to telescopically receive a panel support member such as the panel rib 42 illustrated in FIG. 2. In a preferred embodiment, the panel rib 42 is of conventional fiberglass construction and has a conventional flat rib shape with an elongated generally rectangular cross section.

As can be seen in FIG. 1, the side walls 32, 34 extend above top wall 36 of housing portion 30. The cooperating structure resembles a channel which, as will be seen, receives and supports a conventional strap 46, as shown in FIGS. 7 and 8, to maintain the rolled configuration of a message panel assembly which has been prepared for storage.

Figure 2:
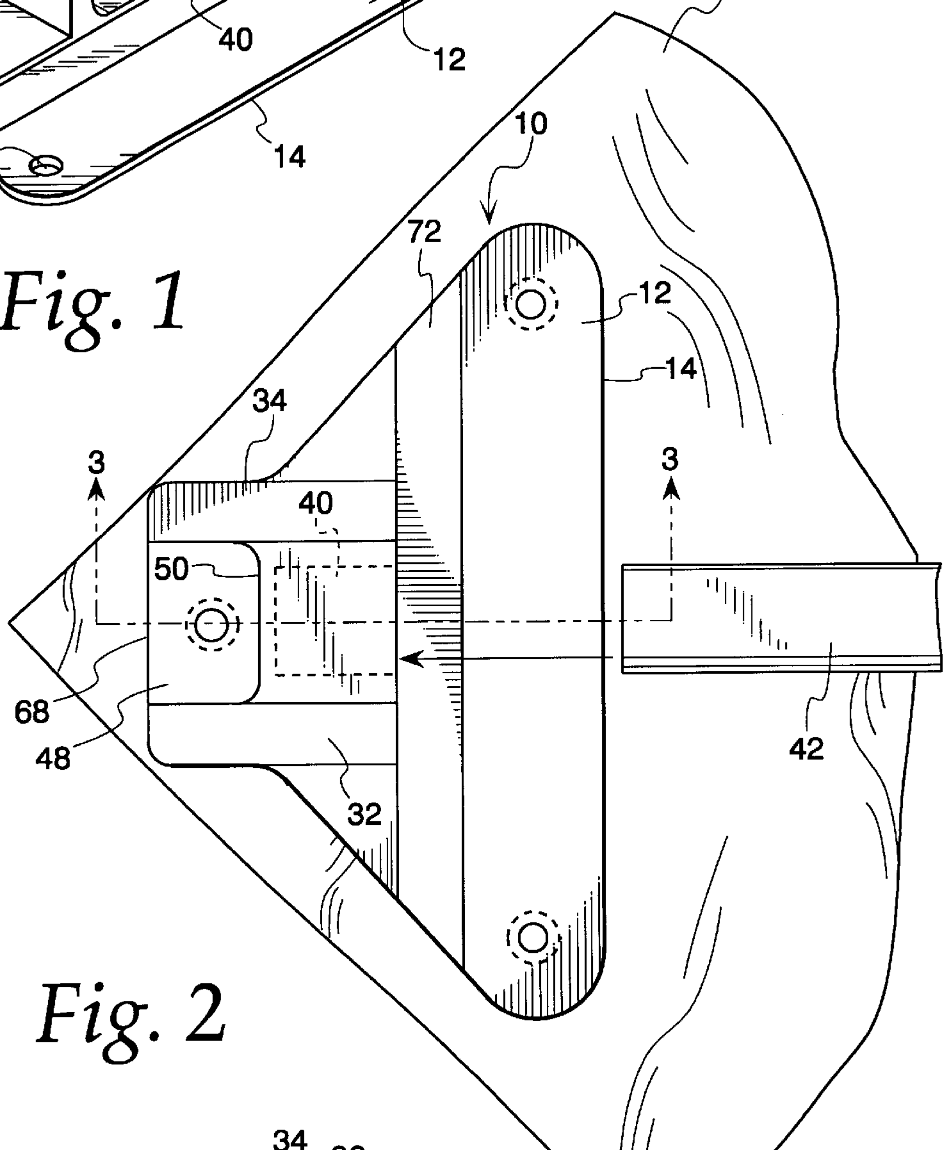
FIG. 2 is a top plan view thereof, shown attached to a corner of a flexible message panel.
Figure 3:
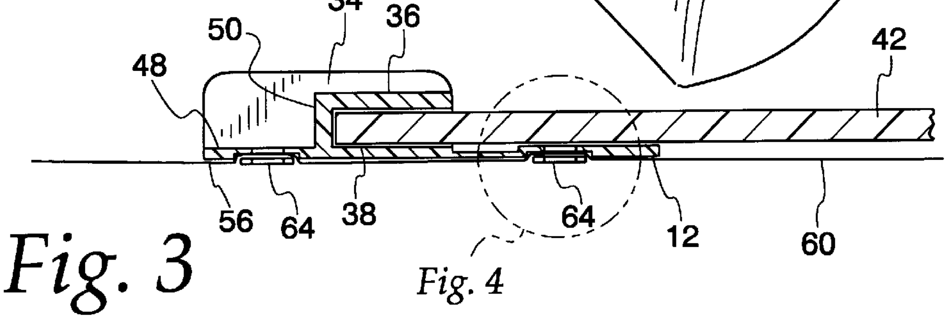
FIG. 3 is a fragmentary cross-sectional view taken along the line 3—3 of FIG. 2.
Figure 14:
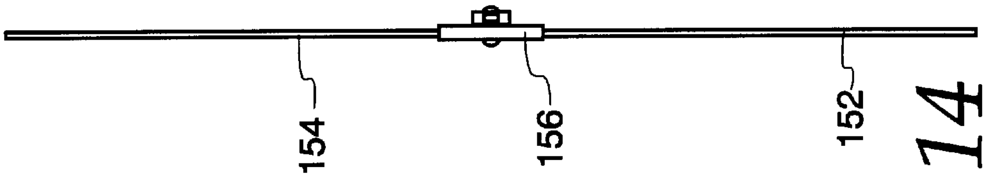
FIG. 14 is a side elevational view thereof.
Figure 13:
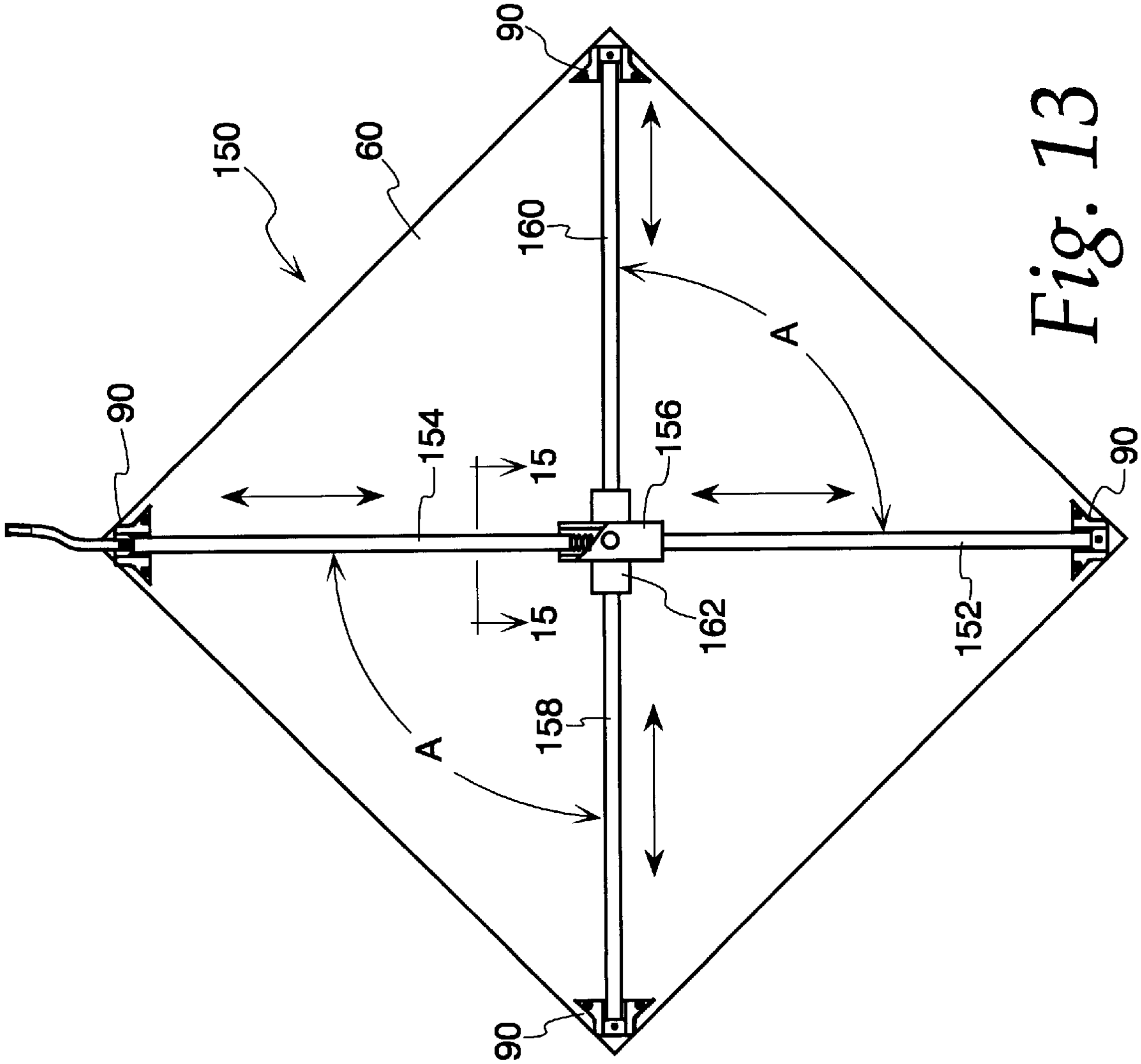
FIG. 13 is an elevational view of a message panel assembly.

As can be seen in FIGS. 1–3, an extension 48 of floor 38 projects beyond an end wall 50 of housing portion 30, between the rear portions of side walls 32, 34. A mounting aperture 52 is located in floor extension 48. The bottom surfaces of threshold 12, floor 38 and floor extension 48 form a continuous generally flat bottom surface 56. As indicated in FIGS. 3–5, the apertures 20, 22 and 52 extend to the generally flat bottom surface 56 of the mounting receptacle. As indicated in FIGS. 3–5, the apertures 20, 22 and 52 have enlarged recessed portions **20*a*, 22*a* and 52*a*, respectively, extending from bottom surface 56. The enlarged recessed portion 22*a* can be seen in FIG. 5, and apertures 20, 52** have recessed portions of similar size and shape.

FIG. 2 shows mounting receptacle 10 attached to a corner portion of a flexible message panel 60. In the preferred embodiment, the cavity of housing portion 30 faces toward the middle of the message panel. As indicated in FIG. 6, the flat bottom surface 56 of the mounting receptacle is positioned on one surface of the message panel 60 and conventional fasteners 64, preferably rivets, secure the message panel 60 to the mounting receptacle. As can be seen by comparing FIGS. 4 and 5, a portion of the message panel 60 is drawn into the enlarged recess to securely trap or clinch the message panel. As can be seen in FIGS. 1 and 2, for example, it is generally preferred that the mounting receptacle be secured at three points to the message panel 60.

With reference to FIG. 2, as support rib 42 is mated with the message panel assembly, the support rib passes over the front edge of threshold 12. Threshold 12 provides a guide surface for the support rib to help align the support rib 42 for entry into a housing pocket or cavity 40. Typically, mounting receptacle 10 is much smaller than the message panel to which it is attached. For example, with reference to FIG. 2, the distance between front and rear edges 14, 68 of the mounting receptacle is approximately 2½ inches, whereas the message panels typically have square configurations, measuring 30 to 48 inches on a side. The support rib 42 is initially held close to the surface of the message panel as the message panel receives a stretching force imparted to it by the support rib, and is thereby approximately aligned with threshold 12.

Typically, the reinforcing ribs of conventional flexible sign panels are joined together at the center so as to collapse with a scissors action, once one of the cross ribs is loosened from its attachment to the message panel. With the support ribs pivoted so as to overlie one another, the message panel is then rolled about the support ribs in the manner indicated in FIG. 7. As mentioned, the tether or strap 46 is attached in a conventional manner to the message panel so as to provide an outer wrap for the rolled package in the manner indicated in FIGS. 7 and 8. Accordingly, the mounting receptacle is pressed against the rolled package.

Referring to FIGS. 1, 2 and 8, the housing portion 30 is joined to the forward portion of plate 12 by a flexible portion or living hinge 72. In the preferred embodiment, hinge 72 is conveniently provided by forming a groove in the upper surface of the threshold thereby reducing the thickness and increasing the flexibility of the threshold in the region immediately in front of the housing portion 30. As can be seen in FIG. 2, the hinge 72 lies in the mid-portion of the mounting receptacle. With reference to FIG. 8, the hinge portion allows the mounting receptacle to bend about its mid-portion to more closely conform to the rolled sign panel.

When the sign panel is tightly rolled, considerable stresses are required to secure the strap 46. Accordingly, it is desirable that the rolled sign panel be protected or cushioned from forces imparted by the strap 46, and that the strap be constrained in a desired position. For example, with reference to FIG. 7, it can be seen that the direction of rolling of the message panel results in a cross section resembling a triangle. Accordingly, if strap 46 were allowed to shift toward the top or bottom of the rolled package, the desired tension in the strap would be lost and the integrity of the rolled package would be compromised. Accordingly, the mounting receptacle of the present invention is provided with a recessed top wall 36 with the strapping received in the recess formed between side walls 32, 34 as indicated in FIG. 8.

The hinged threshold 12 also allows the housing portion to momentarily bend back, away from the desired flat plane of the message panel while the panel rib is initially aligned for eventual entry into the housing cavity. With the hinged connection, the upstanding housing portion can be readily grasped for application of a pulling force on the flexible message panel to properly tension the panel in preparation for insertion of the panel rib into the housing cavity. At times, considerable tension must be applied to the message panel to pull it flat and taut, to assume a planar configuration. The hinged connection allows a user to bend the housing portion (located at the outermost corner of the message panel assembly) at an angle to the message panel for a better grip on the panel. The hinge portion 72, made of a tough plastic material, transmits the pulling force to the message panel in a safe manner. During this time, thumb pressure can also be applied to the upstanding housing portion while the free end of the support rib is placed against threshold 12. Thereafter, the hinge connection allows the housing portion to be rolled onto the free end of the support rib. Bending of the housing portion also brings the housing portion into ready alignment if the support rib must be bowed, a practice which has become widespread.

Turning now to FIGS. 9–12, an alternative mounting receptacle is generally indicated at 90. Receptacle 90 includes the housing portion 30 as described above. Wing portions 92, 94 contain apertures 96, 98, respectively, for mounting the forward end of receptacle 90. If desired, the mouth 102 of cavity 40 can be flared in the shape of a funnel to help direct a support rib into the cavity, if desired. As a further alternative, the wing portions 92, 94 can be omitted if a swiveling action of the mounting receptacle about the rivet connection in hole 52 is desired.

As can be seen in FIGS. 9–12, the overall depth of the mounting receptacle is made considerably shorter by omitting the threshold and hinge portions discussed above. It has been found that if the depth is made short within certain limits, that adequate support of the panel rib can still be provided, while avoiding interference with the rolled panel package (see FIG. 12, for example). If the overall depth of the mounting receptacle is too long without benefit of a hinge for any included threshold, then it will not be able to conform to the outer surface of the rolled package, but instead will rock along tangent lines to the rolled package's circular cross-section. The following information is given for commonly available fiberglass panel ribs.

TABLE I

| | | Cavity and Receptacle Relative Sizes For Fiberglass Panel Ribs | | | |
|---|---|---|---|---|---|
| Panel Size (Unrolled) | Avg. Max. Rolled Circumference (C) | Minimum Rib Size (T, w) | Cavity Depth (D) | Cavity Relative Size (D/W) | Receptacle Relative Size (D/C) |
| 30" × 30" | 8" | .125 × 1.00 | 0.5–1.2" | .50–1.2 | 6.25%–15% |
| 36" × 36" | 10" | .1875 × 1.25 | 0.625–1.5" | .50–1.2 | 6.25%–15% |
| 48" × 48" | 12" | .25 × 1.25 | 0.625–1.5" | .50–1.2 | 5.2%–12.5% |
| 24" × 48" | 12" | .1875 × 1.25 | 0.625–1.5" | .50–1.2 | 5.2%–12.5% |

As can be seen from the above preferred arrangements for fiberglass ribs, the cavity depth (D) ranges between 50% and 120% of the rib width (W). Preferably, with any type of rib, the cavity depth ranges between 50% and 120% of the rib width and most preferably the cavity depth ranges between 80% and 100% of the rib width. This allows the cavity depth (D) to range between 5% and 15% of the Max. Rolled Circumference (C). Most preferably the cavity depth (D) ranges between 7% and 14% of the Max. Rolled Circumference (C).

It is generally preferred that the mounting receptacle be made of plastic material so as to provide a degree of conformance to the flexible message panel during deployment of the message panel. Further, the preferred plastic material can be readily adapted to form a living hinge coupling the housing portion to any threshold portion that may be provided with the mounting receptacle. As mentioned, the hinge provides an increased conformance to a message panel rolled into a compact form, and to relieve stresses which might be imparted to the mounting receptacle, preventing the stresses from being transferred to the message panel in a manner which would damage or otherwise deteriorate coupling of the mounting receptacle to the message panel. If desired, however, the mounting receptacle can be made of rigid materials joined together by a separate hinge.

In the arrangement shown in FIG. 9, for example, the threshold and consequently the hinge portion have been omitted. However, it may be desirable in certain applications to break the sidewalls 32, 34 at points adjacent the housing portion rear wall 52 so as to provide an increased compliance, and so as to also provide a mounting receptacle which is temporarily bent adjacent its mid-portion to allow a user a better purchase or grip on the message panel as the message panel is being pulled taut in preparation for mating of the support rib with the mounting receptacle. The preferred line of bending is indicated by dotted line 104 in FIG. 10. Preferably, the parting line would extend through sidewalls 32, 34 from the upper surface, to a point adjacent the upper surface of floor extension 48.

Figure 15:
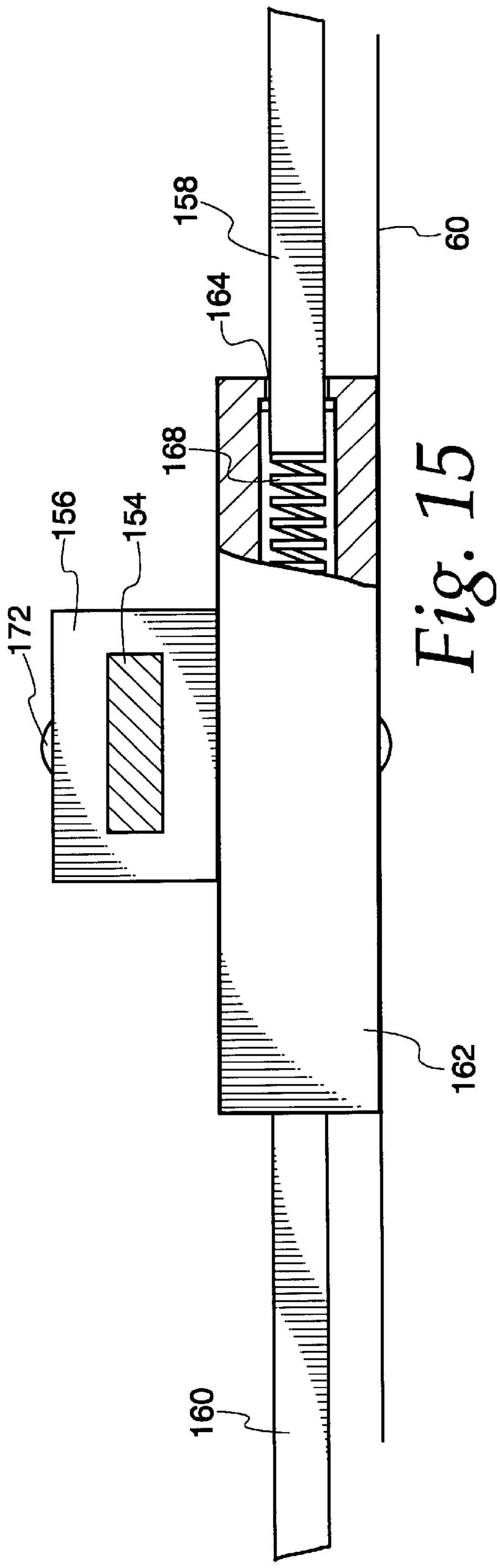
FIG. 15 is a fragmentary cross-sectional view taken along the line 15—15 of FIG. 13.
Figure 16:
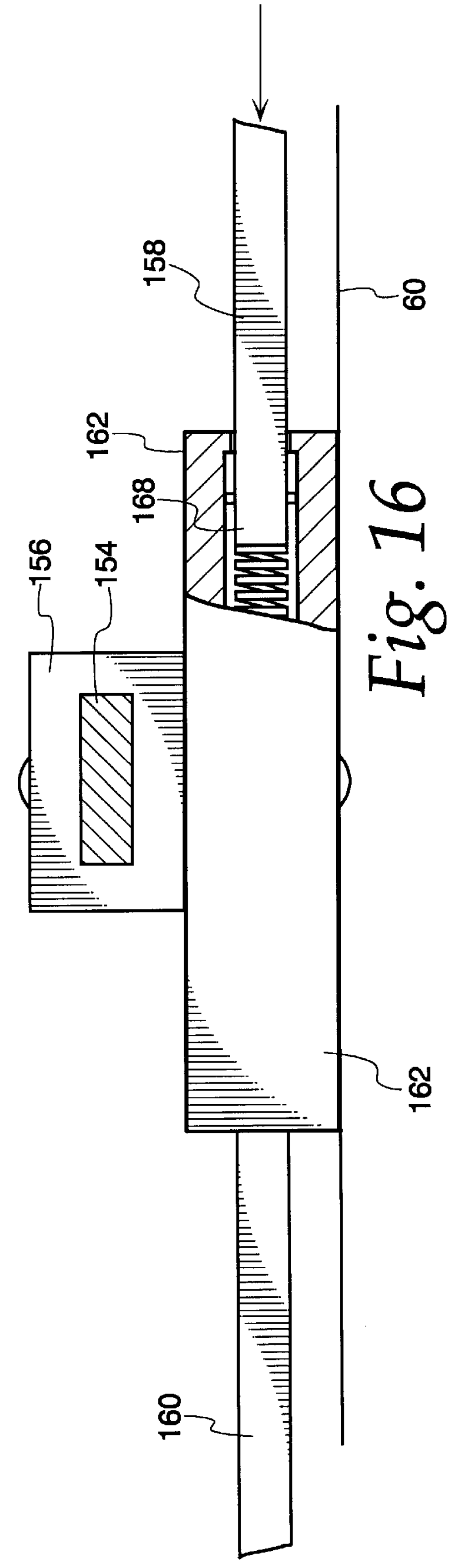
FIG. 16 is a view similar to that of view FIG. 15, but showing a subsequent operation.

Turning now to FIGS. 13–16, an alternative message panel assembly is generally indicated at 150. A flexible message panel 60 has mounting receptacles 90 attached at the corners thereof, with panel ribs extending between the mounting receptacles. The arrangement illustrated in FIG. 13, the vertical panel rib is preferably made of two rib parts 152, 154, colinearly aligned, with their adjacent ends received in a central housing 156. Similarly, the horizontal rib preferably comprises rib parts 158, 160 colinearly aligned with their adjacent ends received in central housing 162. As can be seen in FIG. 15, the rib part 158 is received in an opening 164 formed in one end of central housing 162. The rib part 158 is biased in an outward direction by spring member 168. The other rib parts 152, 154 and 160 are similarly spring loaded within their respective central housings, and the central housings 156, 162 are pinned together at 172 for relative rotation.

As explained above with reference to FIG. 11, panel ribs 42 are received within the pocket formed in mounting receptacle 90. In use, it is customary to bend the panel rib 42

(in the manner of bending an archer's bow) and to introduce the free end of the panel rib into the mouth of the receptacle pocket. By releasing the panel rib from its bent position the free end of the panel rib travels within the receptacle pocket. It has been found difficult, on occasion, to perform the above-described maneuver. For example, when flexible message panels are required to be installed along a roadside, dusty wind conditions and wind bursts from passing vehicles can generate very substantial sail forces, making it difficult to thread the free end of the panel rib in the receptacle pocket. With the arrangement shown in FIGS. 13–16, the need for bending the panel ribs is avoided. Rather, the panel ribs are translated in the direction of the arrows shown in FIG. 13, along their central axes so as to compress the bias springs 168. As the free end of the panel ribs are lined up with the mouth of the respective receptacle pocket, the ribs are released so as to allow the springs 168 to extend, bringing the free ends of the ribs into more complete insertion within the mounting receptacle pockets. If desired, the panel ribs and biasing springs can be dimensioned so as to maintain a predetermined force on the rear wall of the panel receptacle pocket and to maintain the force on the mounting receptacle after the panel assembly is erected. This allows a flexible message panel to be maintained in a taut condition despite dimensional changes to the message panel caused by temperature. For example, when the flexible message panels are placed in intense sunlight and allowed to become heated, the material properties of the panels changes substantially, allowing the message panels to "grow". With the arrangement of the present invention, in effect, the panel ribs will grow along with the message panel to maintain the desired predetermined taut condition.

Turning now to FIGS. 17–20 and 31–33, an alternative mounting receptacle is generally indicated at 200. Receptacle 200 includes a floor 202 and an upper wall 204 having a recessed portion 206. A hollow pocket 208 is formed between floor 202 and top wall 204. The hollow pocket 208, as can be seen for example in FIGS. 31 and 33, extends from rear wall 230 to an internal stop wall 232 (visible in FIG. 32) formed on either side of an opening 234. As can be seen in the top plan view of FIG. 19, top wall 204 is cut out at 212 to expose a portion of floor 202 which serves as a landing or threshold to help align the panel rib with the hollow pocket. Bevelled walls 214 also help to orient the panel ribs at the mouth of pocket 208.

Figure 19:
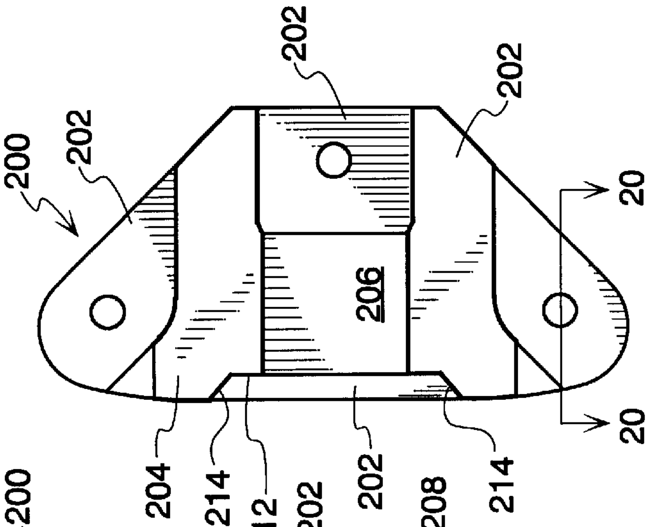
FIG. 19 is a top plan view thereof.
Figure 18:
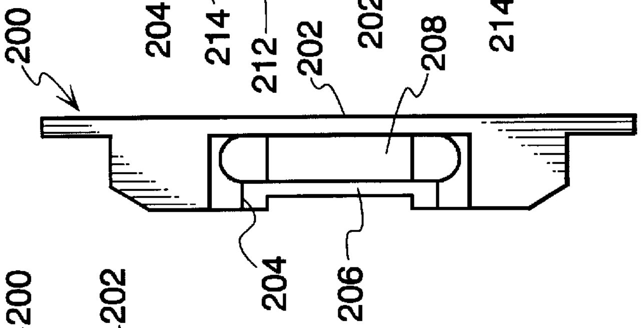
FIG. 18 is a rear elevational view thereof.
Figure 17:
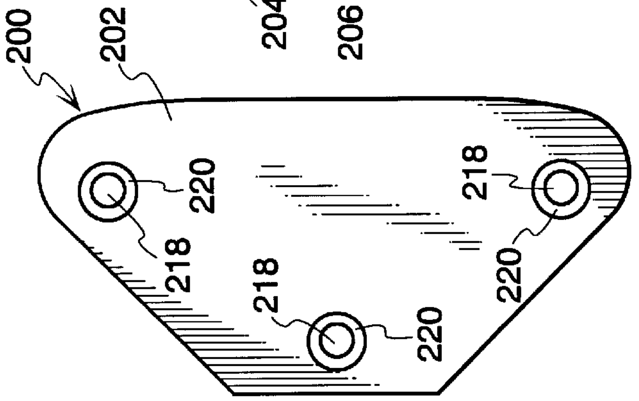
FIG. 17 is a bottom plan view of a mounting receptacle.
Figure 31:
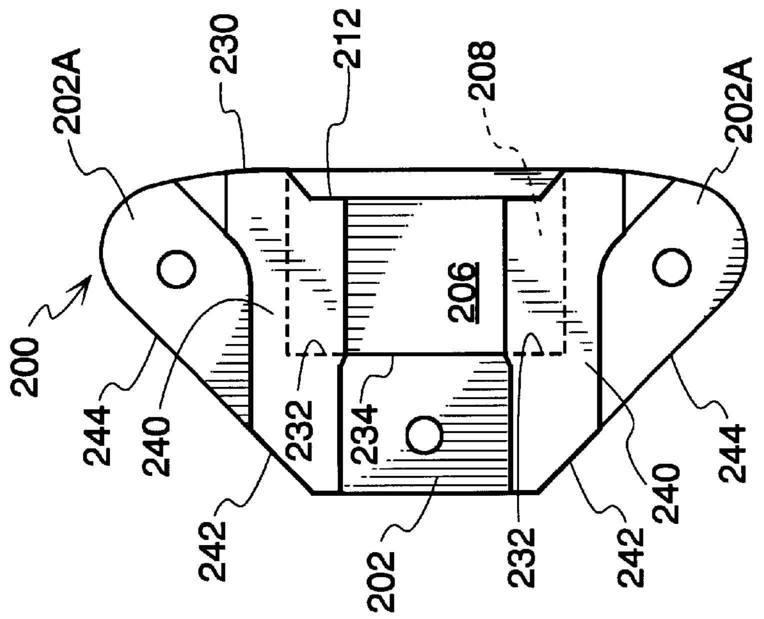
FIG. 31 is a top plan view similar to that of FIG. 19.
Figure 33:
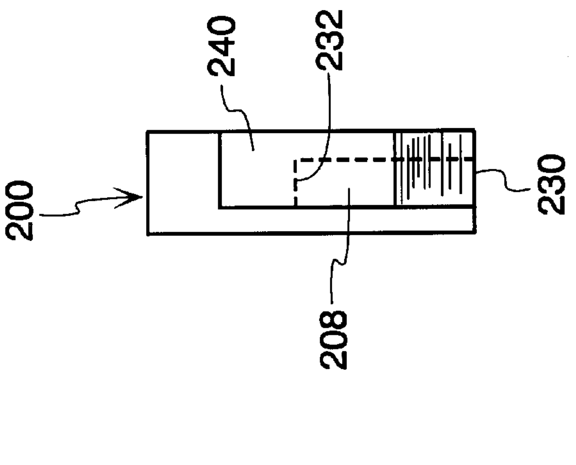
FIG. 33 is a side view thereof.

As can be seen, for example, in FIGS. 19 and 31, floor 202 extends forwardly of recessed portion 206 of the top wall. Relatively massive side portions 240 are bevelled at their forward ends to form converging front walls 242 to facilitate insertion of the mounting receptacle 200 in a sign-mounting socket such as that described in U.S. Pat. No. 4,888,894. As can be seen, for example, in FIG. 31, the bevelled front walls 242 are blended with the bevelled edges 244 of the wing-like outlying portions 202*a* of floor 202. This aids in coordinating the simultaneous entry of the outlying floor portions 202*a* in a slot of the sign mounting socket as the remainder of the mounting receptacle 200 is also inserted in the sign-mounting socket. Preferably, the end of the top wall formed by cut-out 212 engages a releasable hook associated with the sign mounting socket of U.S. Pat. No. 4,888,894.

Figure 20:
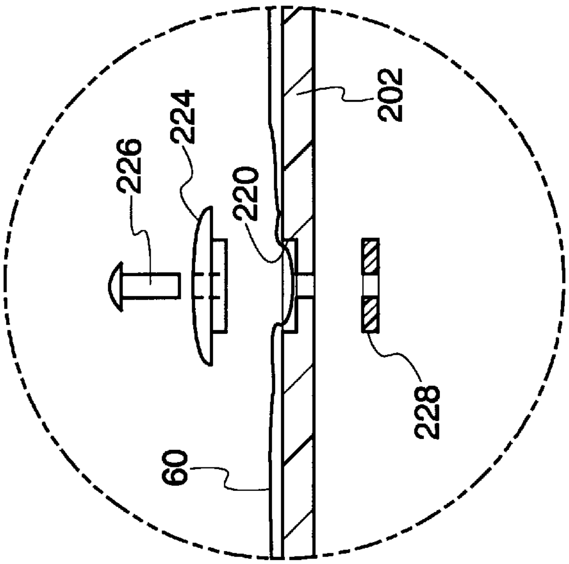
FIG. 20 is a fragmentary cross-sectional view taken along the line 20—20 of FIG. 19.

As can be seen in FIG. 20, mounting holes 218 have optional surrounding step depressions 220 to trap flexible message panel 60 by a step button-like fastener 224. Fastener 224 is compressed against floor 202 by rivet fastener 226 which is headed over after passing through washer 228.

Figure 21:
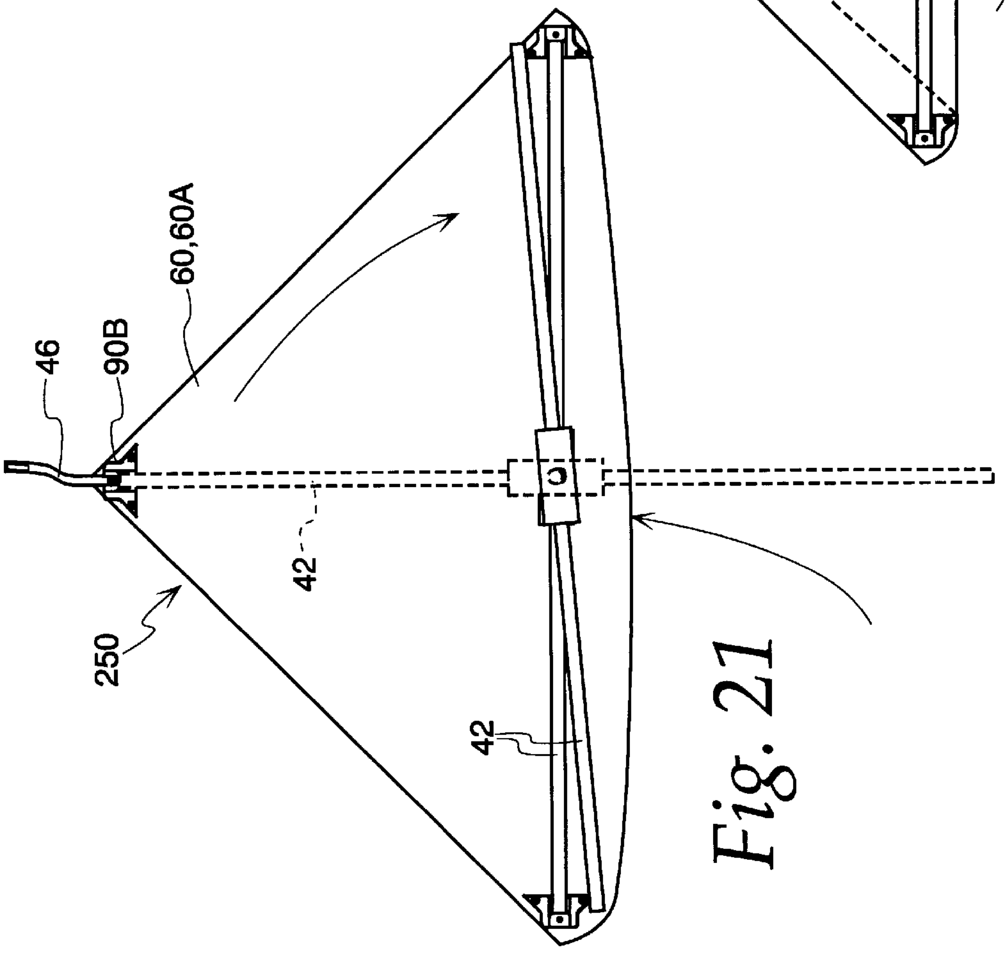

Turning now to FIGS. 21–30, it will be seen that the flexible message panel assembly generally indicated at 250 can be rolled in one of two ways, the first illustrated in FIGS. 21–26 and the second illustrated in FIGS. 27–30. Advantages of the flexible message panel assembly 250 include its relatively light weight, and its ability to be readily collapsed and rolled in a small package (see FIGS. 25 and 29) for storage. Referring to FIG. 21, either the vertical or the rib is released from its mounting receptacles and rotated in the direction to bring the two ribs in overlying relationship as indicated in FIG. 21. Preferably, the ribs of the flexible message panel assembly are pinned together at their central portions to allow the relative rotation. It is not necessary to release the second rib from its mounting receptacles and in practice, the second rib is preferably left connected to its respective mounting receptacles such that the flexible message panel remains stretched or taut in at least one linear direction. If desired, the second rib may be permanently joined to the flexible message panel.

Figure 22:
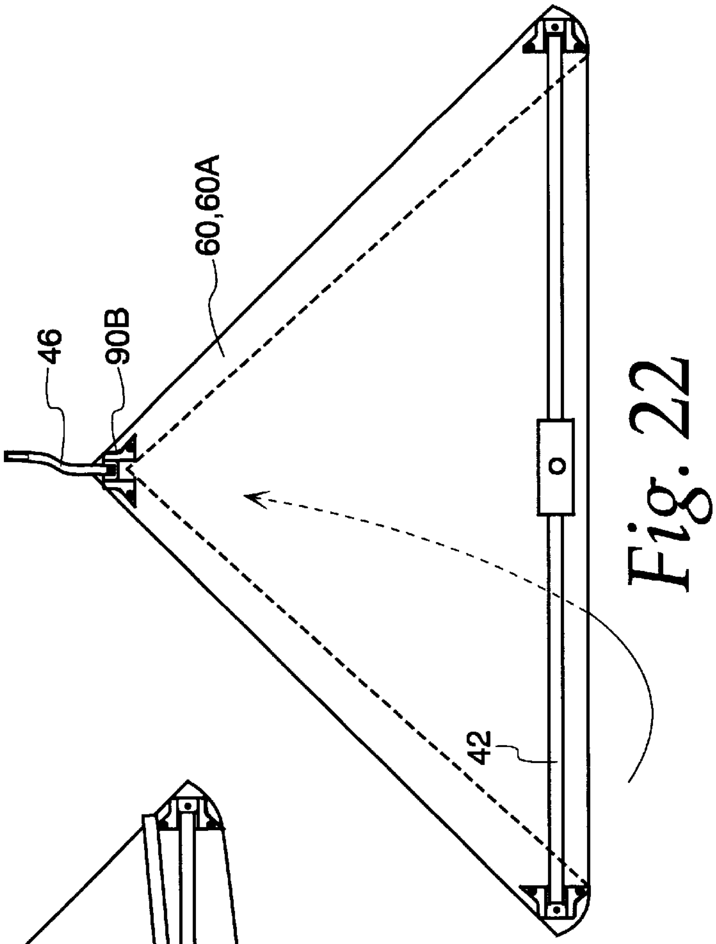
FIGS. 21 and 22 are elevational views showing storage of a message panel assembly.

As indicated in FIGS. 21 and 22, the lower corner of the flexible message panel 60 is folded underneath the major portion of the flexible message panel assembly. As illustrated in the figures, the reverse surface 60*a*, i.e. the surface contacting the support ribs and which does not typically carry the message indicia, is made visible. Accordingly, as indicated in FIG. 22, the reverse surface 60*b*, normally carrying the message indicia is folded against itself, as can be seen in FIG. 23.

Figure 24:
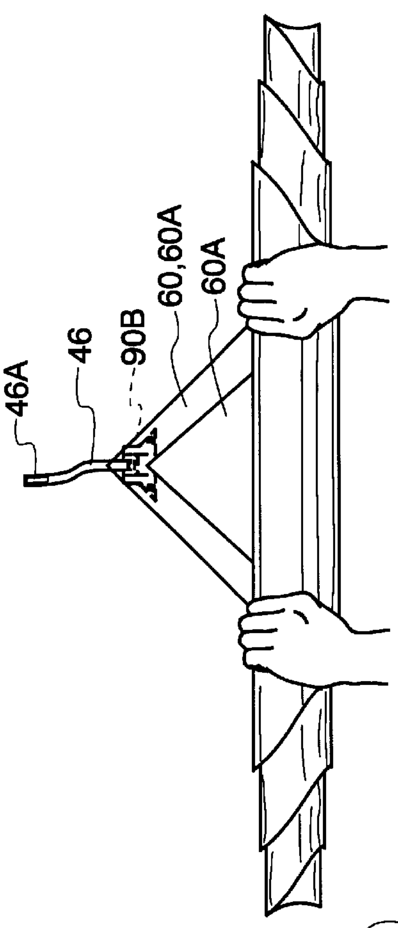
FIG. 24 is a front elevational view thereof showing a subsequent stage of the rolling operation.
Figure 25:
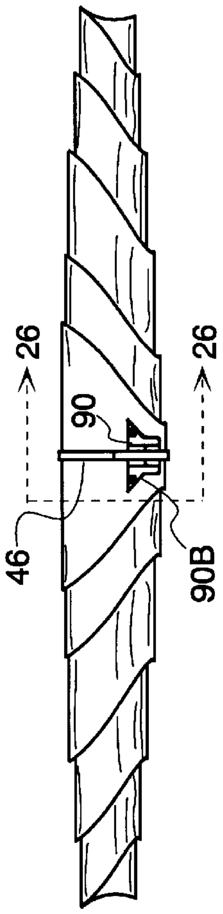
FIG. 25 is an elevational view showing rolling of a package completed, and with the flexible tether secured.
Figure 23:
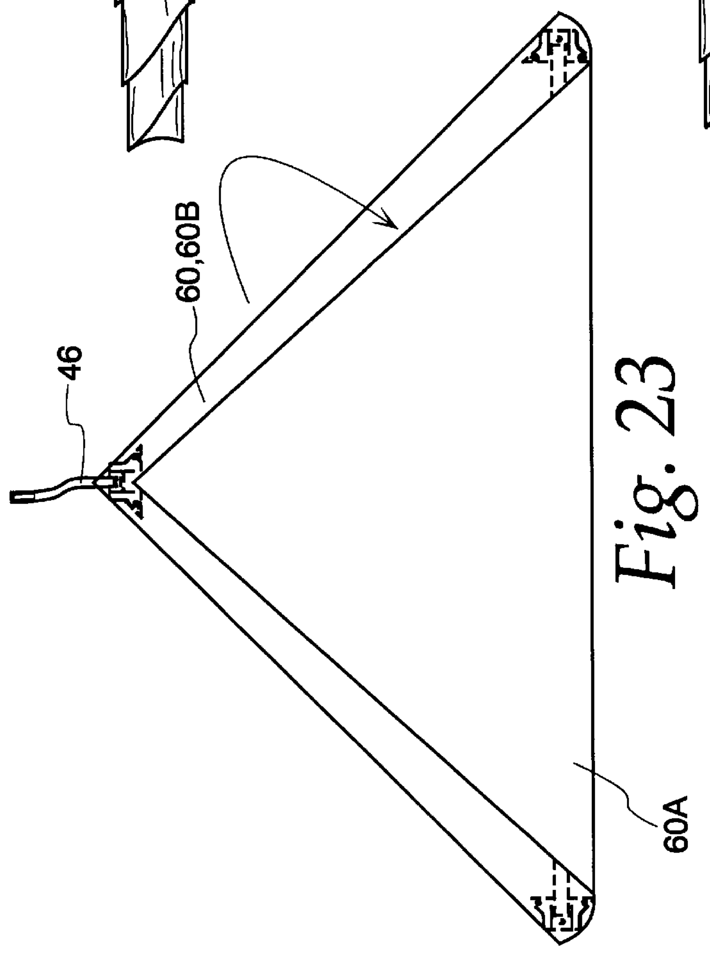
FIG. 23 is a rear elevational view thereof.
Figures 26, 27, 28:
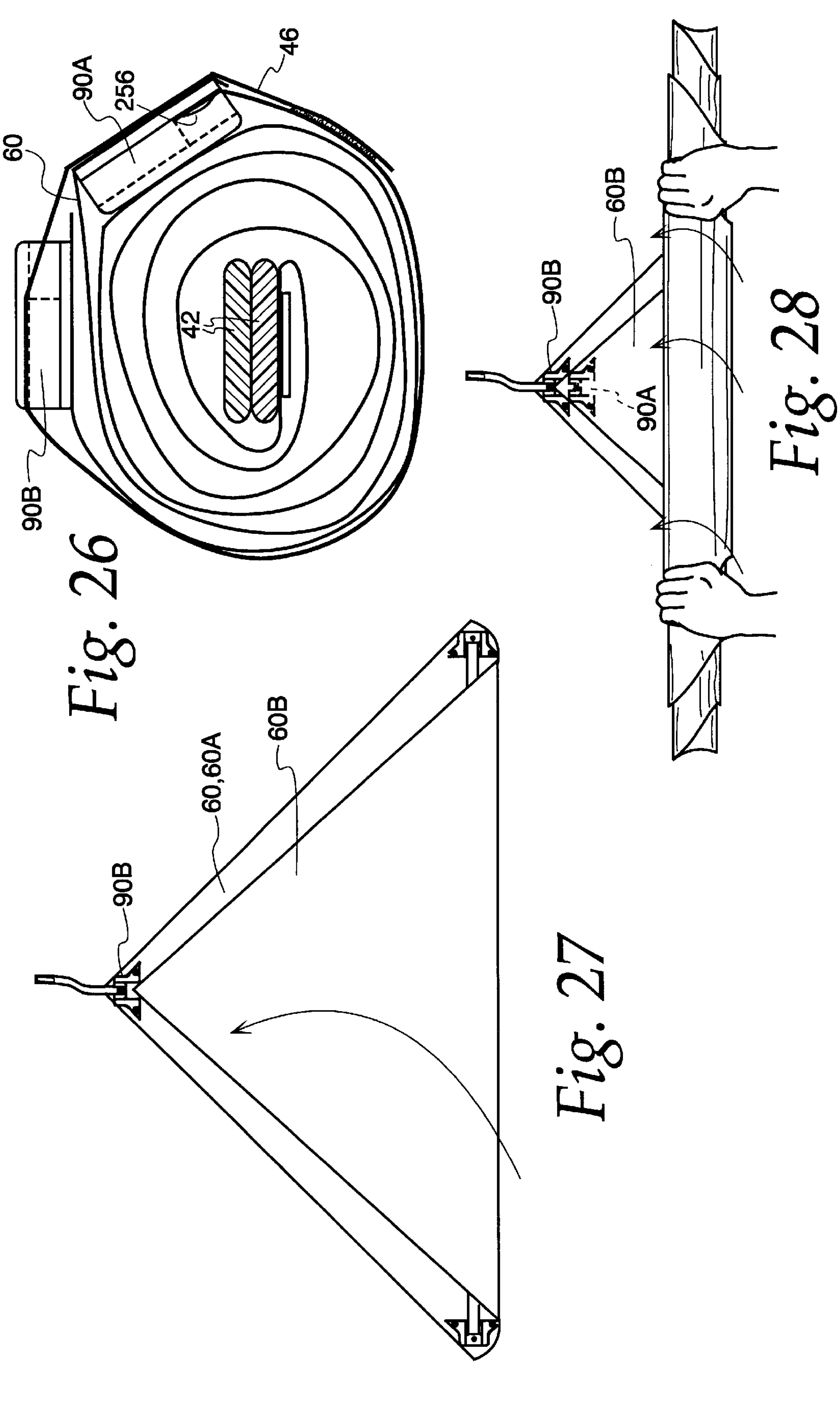
FIG. 26. is a cross-sectional view taken along line 26—26 of FIG. 25.
FIG. 27 is an elevational view of a message panel assembly being rolled in a direction opposite to that shown in FIGS. 21–26.
FIG. 28 is an elevational view showing further rolling of the sign assembly.

In FIGS. 23 and 24, the mounting receptacles are shown in phantom since they are hidden underneath the flexible message panel. FIG. 24 shows the direction of rolling of the message panel in preparation for strap 46 to be wound about the rolled package, as indicated in FIG. 25. As mentioned above, fastening means are provided for securing strap 46 to the rolled package. Preferably, strap 46 is provided with hook and loop fastener material and is of a length so as to completely encircle the rolled flexible message panel assembly, in the manner indicated in FIG. 26. Referring now to FIG. 26, a first mounting receptacle 90a is located beneath a layer of flexible message panel 60, and is secured by a rivet fastener 256 to a first free end of strap 35. A strap 46 extends from the first mounting receptacle 90*a* to encircle the rolled package, passing over the top of a second mounting receptacle 90*b* and passing over the first mounting receptacle 90*a* before being joined at its free end 46*a* to an underlying layer of strap material. As can be seen in FIG. 26, the strap 46 is laid within the recessed upper surface 36 of the second mounting receptacle 90*b*. As can be seen in FIG. 25, and as explained above, the strap 46 is secured in the recessed portion 36 against inadvertent lateral dislodgement as when the rolled package illustrated in FIG. 25 is slid end-first into a storage chamber so as to drag the strap 46 against the walls of the chamber or against materials previously deposited in the storage chamber.

Figure 29:
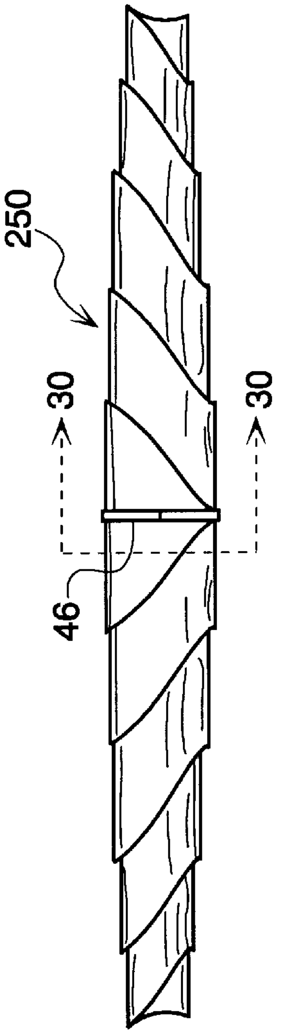
FIG. 29 shows the message sign panel in a fully rolled condition.
Figure 30:
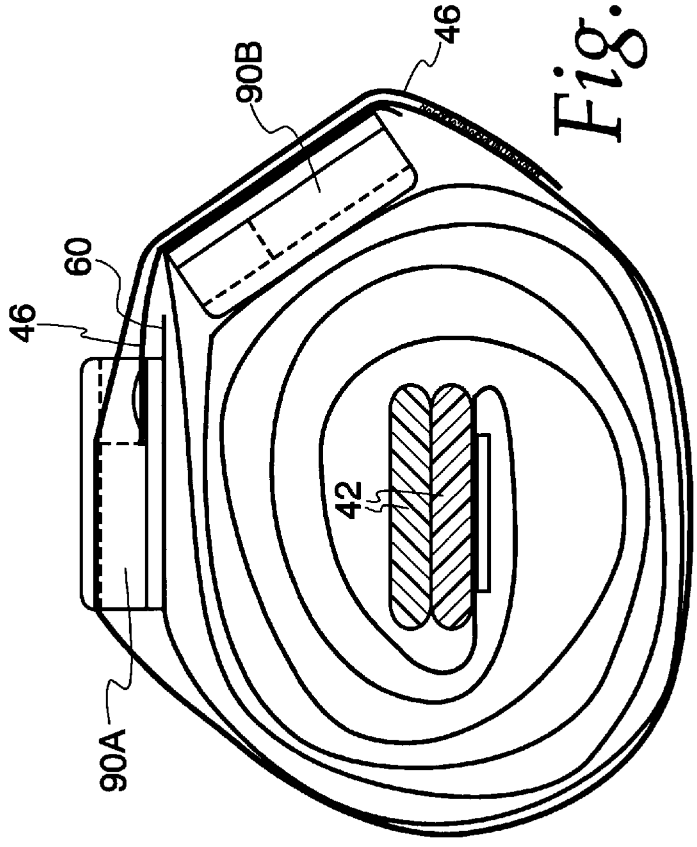
FIG. 30 is a fragmentary cross-sectional view taken along the line 30—30 of FIG. 29.
Figure 32:
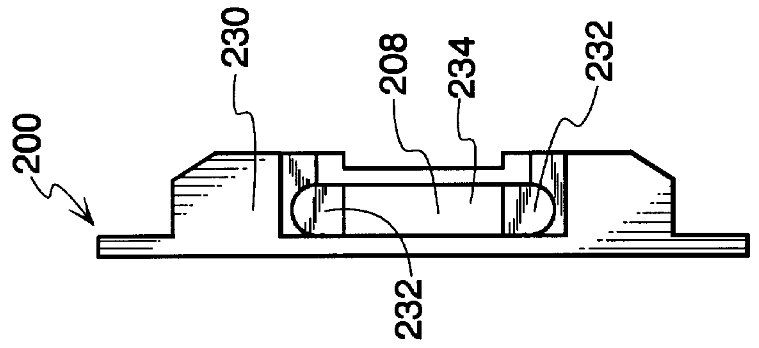
FIG. 32 is an elevational view similar to that of FIG. 18.

Referring now to FIGS. 27–30, the flexible message panel 60 is rolled in an opposite sense, such that its front surface 60*b*, the surface normally carrying the message indicia, is fully exposed after folding. The flexible message panel assembly is rolled in the manner of FIG. 28 and strap 46 is rolled about the package and secured to itself to develop the completely rolled package as illustrated in FIG. 29. As can be seen in FIG. 30, the upper recess of the mounting receptacle 90*a* guides the strap 46 and retains the strap against inadvertent lateral dislodgement. As can be seen from the above, the mounting receptacles are disposed such that their upper recesses effectively guide the strap against inadvertent lateral misalignment no matter which direction the flexible message panel assembly is rolled.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A mounting receptacle for attaching a support rib to a flexible panel, comprising:

a housing portion having opposed front and rear walls, opposed upper and floor walls and a pair of spaced apart side portions extending between the front and rear walls, the housing portion further having a stop wall intermediate the front and rear walls and cooperating with the top wall, floor wall and side portions to define an interior cavity with the rear wall defining an opening which leads to the interior cavity and which is dimensioned to receive the support rib, the floor wall having a bottom surface for engaging the flexible panel, the side portions and the floor extending beyond the stop wall to form a mounting location with first means for attachment to the panel;

a threshold portion adjacent the opening having an upper surface for guiding the support rib toward the opening; and the side portions having tapered forward ends defining portions of said front wall which converge toward each other.

2. The apparatus of claim 1 wherein the attachment means comprise apertures formed in the floor wall for receiving fastener elements securing the panel to the floor wall.

3. The apparatus of claim 2 wherein the floor wall defines recesses surrounding the apertures.

4. The apparatus of claim 1 wherein the side portions have upper ends extending above the upper wall of the housing portion to cooperate therewith to define a channel for guiding a tether wrapped around the mounting receptacle.

5. The apparatus of claim 1 wherein the threshold portion has a trapezoidal shape.

6. The apparatus of claim 1 wherein the stop wall comprises a plurality of spaced apart wall portions.

7. The apparatus of claim 1 wherein the side portions adjacent the rear wall are outwardly flared.

8. A mounting receptacle for attaching a support rib to a flexible panel, comprising:

a housing portion having opposed front and rear walls, opposed upper and floor walls and a pair of spaced apart side portions extending between the front and rear walls;

the housing portion further having a stop wall intermediate the front and rear walls and cooperating with the top wall, floor wall and side portions to define an interior cavity;

the rear wall defining an opening which leads to the interior cavity and which is dimensioned to receive the support rib;

the floor wall having a bottom surface for engaging the flexible panel;

the stop wall comprising a plurality of spaced apart wall portions;

the side portions and the floor wall extending beyond the stop wall to form a mounting location with first means for attachment to the panel;

a threshold portion adjacent the opening having an upper surface for guiding the support rib toward the opening; and the side portions having tapered forward ends defining portions of said front wall which converge toward each other.

9. The apparatus of claim 8 wherein the attachment means comprise apertures formed in the floor wall for receiving fastener elements securing the panel to the floor wall.

10. The apparatus of claim 9 wherein the floor wall defines recesses surrounding the apertures.

11. The apparatus of claim 8 wherein the side portions have upper ends extending above the upper wall of the housing portion to cooperate therewith to define a channel for guiding a tether wrapped around the mounting receptacle.

12. The apparatus of claim 8 wherein the threshold portion has a trapezoidal shape.

13. A mounting receptacle for attaching a support rib to a flexible panel, comprising:

a housing portion having opposed front and rear walls, opposed upper and floor walls and a pair of spaced apart side portions extending between the front and rear walls, the housing portion further having a stop wall intermediate the front and rear walls and cooperating with the top wall, floor wall and side portions to define an interior cavity with the rear wall defining an opening which leads to the interior cavity and which is dimensioned to receive the support rib, the floor wall having a bottom surface for engaging the flexible panel, the side portions and the floor extending beyond the stop wall to form a mounting location with first means for attachment to the panel;

a threshold portion adjacent the opening having an upper surface for guiding the support rib toward the opening;

the side portions having tapered forward ends defining portions of said front wall which converge toward each other; and the side portions having upper ends extending above the upper wall of the housing portion to cooperate therewith to define a channel for guiding a tether wrapped around the mounting receptacle.

14. The apparatus of claim 13 wherein the side portions have upper ends extending above the upper wall of the housing portion to cooperate therewith to define a channel for guiding a tether wrapped around the mounting receptacle.

15. The apparatus of claim 13 wherein the threshold portion has a trapezoidal shape.

16. The apparatus of claim 12 wherein the attachment means comprise apertures formed in the floor wall for receiving fastener elements securing the panel to the floor wall.

17. The apparatus of claim 16 where in the floor wall defines recesses surrounding the apertures.

* * * * *